Oct. 10, 1933.    M. LOUGHEAD    1,929,750
HOSE FITTING FOR FLUID PRESSURE SYSTEMS
Filed Feb. 6, 1928
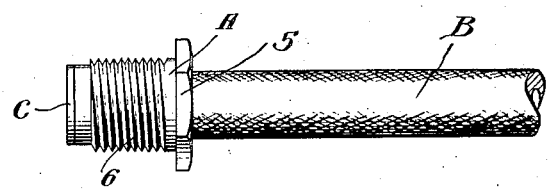
Fig. 1.
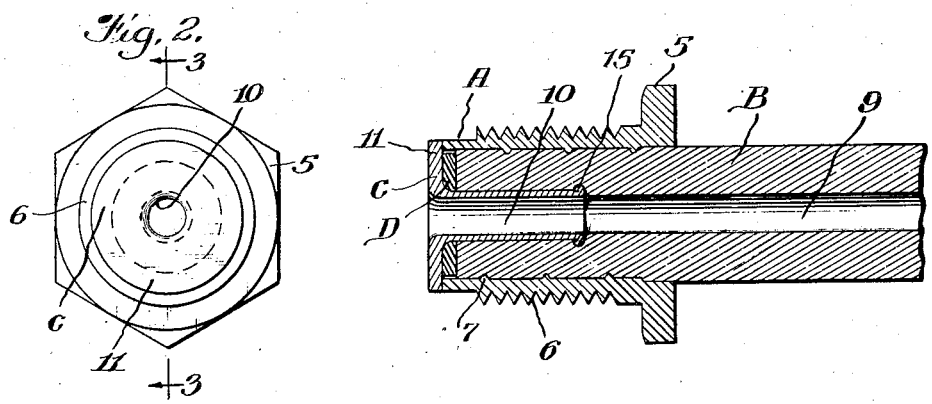
Fig. 2.
Fig. 3.
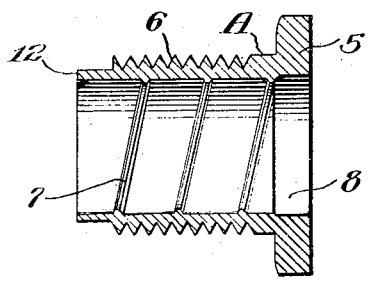
Fig. 4.
Inventor
Malcolm Loughead
By Williams, Bradbury, McCaleb & Hinkle
Attys.

Patented Oct. 10, 1933

1,929,750

UNITED STATES PATENT OFFICE 1,929,750

HOSE FITTING FOR FLUID PRESSURE SYSTEMS

Malcolm Loughead, Detroit, Mich., assignor to Hydraulic Brake Company, Los Angeles, Calif., a corporation of California Application February 6, 1928. Serial No. 252,068

3 Claims. (Cl. 285—84)

My invention relates to improvements in hose fitting for fluid pressure systems.

The invention will be explained as embodied in that type of hose connection used in hydraulic brake systems, such as fully disclosed and described in my prior Patent No. 1,531,798, issued March 31, 1925.

An object of the invention is to provide an improved hose fitting for fluid pressure systems. A further object is to provide a hose fitting having relatively few parts and which may be assembled easily.

A further object is to provide a hose fitting which engages with the hose substantially throughout the entire length of the fitting, thereby allowing the use of a fitting shorter than the present type of hose fitting without the sacrifice of adequate engagement with the hose.

A further object is to provide a hose fitting which is relatively cheap to manufacture.

Other objects and advantages will be more particularly pointed out in the following specification and appended claims.

An embodiment of the invention is illustrated in the accompanying drawing forming a part of this application, in which Figure 1 is a side elevation of a hose with the fitting attached;

Figure 2 is an enlarged end elevation of the parts illustrated in Figure 1;

Figure 3 is an enlarged sectional view along the line 3—3 of Figure 2; and

Figure 4 is a sectional view of the outer sleeve of the fitting.

In general, my improved hose fitting consists in an externally threaded outer sleeve A, adapted to receive therein a substantially non-expansible fabric and rubber hose B, the external diameter of hose B being slightly greater than the internal diameter of the sleeve A, an expansible nipple C inserted within the bore of the hose B, and a washer D interposed between the end of the hose B and the adjacent face of the nipple.

Sleeve A is provided at its inner end with a radial flange 5 having the peripheral contour of a hex nut by means of which the fitting may be gripped with a wrench or the like and turned. External threads 6 are cut in the outer wall of the sleeve to be received in internally threaded connecting members forming a part of the fluid system in which the hose with its fittings is to be used.

With reference to Figure 4, the inner wall of the sleeve 5 is provided with helical ribbing 7 and the extreme inner end of the bore of the sleeve is slightly enlarged as shown at 8 so as to assist in the initial introduction of the hose B within the sleeve.

In assembling the fitting upon the hose, sleeve A is held stationary and the end of hose B is inserted in the enlargement 8 of the sleeve. The hose is then turned so as to cause the helical ribbing 7 to engage with the outer wall of the hose and assist in the insertion of the hose B within the sleeve. As the hose is thus wrung into the sleeve it is compressed slightly causing the bore to become slightly restricted.

When the end of the hose B lies substantially at the outer end of the sleeve the metal washer D is pressed against the end of the hose and nipple C is inserted within the bore 9 of the hose. At this time the tubular portion 10 of the nipple is somewhat smaller than the normal inside diameter of bore 9. The radially flanged portion 11 of the nipple lies flat against the outer end 12 of sleeve A and against washer D.

A plunger is then inserted within tubular portion 10 of nipple C causing the nipple to expand, and assume the position shown in Figure 3. The tubular portion is expanded sufficiently to cause the internal diameter of tubular portion 10 to coincide with the normal internal diameter of the bore 9 of the hose.

In order to more fully insure against the working out of nipple C from within the bore 9 of the hose, a slight bead 15 is provided in the innermost end of the tubular portion 10.

One of the outstanding advantages of a hose coupling of this sort where a substantially non-expansible hose is employed, is that the hose at no time during the application of the fitting or as a result of the ultimate attachment of the fitting thereto, is expanded to its elastic limit. The outer portions of the hose are actually contracted and remain so, the only portion of the hose which is expanded being that slight portion surrounding the tubular part 10 of the nipple.

By first decreasing the outer diameter of the hose as occurs when the hose is wrung into the sleeve, the diameter of the fabric covering forming the outermost part of the hose is decreased. When, therefore, the nipple is expanded within the bore the hose material is highly compressed between the nipple and the sleeve but there is no increase in the diameter of the fabric covering which is inherently substantially non-elastic.

When the hose is employed in a high pressure fluid system it is impossible therefore to burst the fabric covering as is true in the case where the fabric covering is slightly expanded as where a sleeve is employed of the same or greater diameter than the external diameter of the hose.

In the assembly of the fitting upon the hose, the contracting of the hose within the sleeve is greatly facilitated by the helical ribbing 7 so that very few turns of the hose are necessary to fully engage the hose with the sleeve prior to the introduction of the nipple.

The purpose and utility of the washer D is to prevent malformation of the flange 11 of the nipple during the expansion of the tubular portion 10 which might occur by virtue of the slight resiliency of the material of which the hose is constructed.

I claim:

1. A hose fitting for a fluid pressure hose comprising an externally threaded sleeve formed with helical ribbing on the inner wall thereof for urging a hose therethrough when turned therein, a nipple having an expansible tubular portion adapted to be received within the bore of the hose when the hose is disposed within the sleeve and expanded therein, said nipple having a flanged portion abutting one end of the sleeve and a washer interposed between the flanged portion of the nipple and the end of the hose.

2. The combination with a substantially non-expansible hose of a hose fitting therefor comprising an externally threaded sleeve, helical ribbing formed on the inner wall of said sleeve and extending throughout substantially the entire length of the sleeve, the internal diameter of said sleeve being slightly less than the diameter of said hose, a nipple having an expansible tubular part adapted to be received within the bore of said hose and having a flanged portion adapted to abut one end of the sleeve and a washer encompassing the tubular part of the nipple and lying between the flanged portion of the nipple and the adjacent end of the hose.

3. The combination of a substantially non-expansible hose, of a hose fitting therefor comprising a sleeve for encompassing the end of the hose, the internal diameter of the sleeve being less than the external diameter of the hose, a nipple having an expansible part adapted for disposition within the bore of the hose and therein expanded to compress the hose between the sleeve and the nipple, and a rigid washer encompassing the expansible part of the nipple and abutting the end of the hose.

MALCOLM LOUGHEAD.